(12) United States Patent
Liebelt et al.

(10) Patent No.: US 11,125,264 B2
(45) Date of Patent: Sep. 21, 2021

(54) TETHERED STUD CLIP

(71) Applicant: Illinois Tool Works Inc., Glenview, IL (US)

(72) Inventors: Scott M. Liebelt, Eau Claire, WI (US); Sean A. Tomaselli, West Bloomfield, MI (US)

(73) Assignee: Illinois Tool Works Inc., Glenview, IL (US)

( * ) Notice: Subject to any disclaimer, the term of this patent is extended or adjusted under 35 U.S.C. 154(b) by 438 days.

(21) Appl. No.: 16/081,498

(22) PCT Filed: Apr. 24, 2018

(86) PCT No.: PCT/US2018/028989
§ 371 (c)(1),
(2) Date: Aug. 31, 2018

(87) PCT Pub. No.: WO2018/212939
PCT Pub. Date: Nov. 22, 2018

(65) Prior Publication Data
US 2020/0200207 A1 Jun. 25, 2020

Related U.S. Application Data

(60) Provisional application No. 62/507,861, filed on May 18, 2017.

(51) Int. Cl.
*F16B 37/04* (2006.01)
(52) U.S. Cl.
CPC .................... *F16B 37/043* (2013.01)
(58) Field of Classification Search
CPC ................ F16B 37/043; F16L 3/233

USPC .................................... 411/175, 112
See application file for complete search history.

(56) References Cited

U.S. PATENT DOCUMENTS

| | | | | |
|---|---|---|---|---|
| 3,465,992 A * | 9/1969 | Schuplin | ................. | F16L 3/233 248/71 |
| 3,758,060 A * | 9/1973 | Schuplin | ............... | F16L 3/1236 248/74.3 |
| 4,100,368 A * | 7/1978 | Thomsen | ............... | H01B 17/24 174/138 D |
| 4,219,064 A * | 8/1980 | Lozano | ................ | F16B 37/041 411/103 |

(Continued)

FOREIGN PATENT DOCUMENTS

CN 104802745 A 7/2015

OTHER PUBLICATIONS

International Search Report and Written Opinion for PCT/US2018/028989.

*Primary Examiner* — Victor D Batson
*Assistant Examiner* — Amit Singh Dhillon
(74) *Attorney, Agent, or Firm* — Quarles & Brady LLP

(57) ABSTRACT

A stud clip is configured to securely couple a fastener to a component. The stud clip includes a first portion, a second portion that is configured to retain a portion of a fastener, and a flexible tether that integrally connects the first portion to the second portion. The first portion is configured to fold relative to the second portion via the flexible tether into a folded state. The stud clip is moveable between the folded state and an extended state in which the second portion is distally located from the first portion.

16 Claims, 6 Drawing Sheets

(56) References Cited

U.S. PATENT DOCUMENTS

| | | | |
|---|---|---|---|
| 4,286,642 A * | 9/1981 | Keatley | F16F 1/36 29/453 |
| 4,376,605 A * | 3/1983 | Thomsen | H05K 7/12 174/138 D |
| 4,869,454 A * | 9/1989 | Byrne | F01N 13/1822 248/610 |
| 5,291,639 A * | 3/1994 | Baum | F16B 5/128 24/289 |
| 5,599,148 A * | 2/1997 | Hirose | B60N 3/046 411/112 |
| 5,660,513 A * | 8/1997 | Shibanushi | F16B 37/0842 411/433 |
| 5,816,762 A * | 10/1998 | Miura | F16B 37/0842 411/433 |
| 6,287,064 B1 * | 9/2001 | Jhumra | F16B 37/043 411/112 |
| 6,431,585 B1 * | 8/2002 | Rickabus | B60R 21/215 24/114.05 |
| 7,654,783 B2 * | 2/2010 | Giraud | F16B 37/041 411/174 |
| 8,231,317 B2 * | 7/2012 | De Gelis | F16B 5/0266 411/174 |
| 8,316,514 B2 * | 11/2012 | Sano | B60R 13/0206 24/297 |
| 2005/0105985 A1 * | 5/2005 | Fritsch | F16B 37/044 411/175 |
| 2007/0248436 A1 * | 10/2007 | Sano | B62D 29/048 411/175 |
| 2011/0044782 A1 * | 2/2011 | Lange | F16B 5/065 411/2 |
| 2012/0014767 A1 * | 1/2012 | Pearson | F16B 37/0842 411/511 |
| 2013/0028681 A1 * | 1/2013 | Limpert | F16B 37/043 411/108 |
| 2015/0300400 A1 * | 10/2015 | Lieven | F16B 37/0857 411/372.6 |
| 2017/0284437 A1 * | 10/2017 | Landsberg | F16B 5/0642 |
| 2018/0058493 A1 * | 3/2018 | Yu | F16B 37/0842 |

* cited by examiner

TETHERED STUD CLIP

RELATED APPLICATIONS

This application is a National Phase of International Application No. PCT/US2018/028989, entitled "Tethered Stud Clip," filed Apr. 24, 2018, which relates to and claims priority benefits from U.S. Provisional Patent Application No. 62/507,861, entitled "Tethered Stud Clip," filed May 18, 2017, both of which are hereby incorporated by reference in their entireties.

FIELD OF EMBODIMENTS OF THE DISCLOSURE

Embodiments of the present disclosure generally relate to tethered stud clips, such as may be used to couple a stud bolt to a component.

BACKGROUND

Fasteners are used to secure various components together. One type of fastener includes a weld stud and a stud nut assembly that secures onto the weld stud.

FIG. 1 illustrates a front exploded view of a known fastener assembly 10 including a weld stud 12 and a nut 14. As shown, a panel 16 and the nut 14 are separate and distinct components. The panel 16 and the nut 14 provide a sub-assembly that secures over the stud bolt 12.

Each of the nut 14 and the panel 16 are separate and distinct components that are separately molded and formed. As can be appreciated, the nut 14 and the panel 16 may be misplaced. For example, the nut 14 and the panel 16 may be separated from one another.

SUMMARY OF EMBODIMENTS OF THE DISCLOSURE

A need exists for a fastener assembly that is not susceptible to having portions being misplaced, lost, or the like. Further, a need exists for a fastener assembly that allows for quicker and easier installation, in that an individual need not search for, find, and manipulate separate and distinct components to complete the fastener assembly.

With those needs in mind, certain embodiments of the present disclosure provide a stud clip that is configured to securely couple a fastener to a component. The stud clip includes a first portion, a second portion that is configured to retain a portion of a fastener, and a flexible tether that integrally connects the first portion to the second portion. The first portion is configured to fold relative to the second portion via the flexible tether into a folded state. The stud clip is moveable between the folded state and an extended state in which the second portion is distally located from the first portion. The first portion, the second portion, and the flexible tether may be integrally molded and formed together as a single piece.

In at least one embodiment, the first portion is a nut retainer and the second portion is a nut that is configured to couple to the fastener. The nut retainer is configured to retain the nut when the nut is folded onto the nut retainer.

The first portion may include a rim, and a circumferential wall extending from an inner diameter of the rim. A central opening is formed through the first portion. The circumferential wall may include arcuate segments separated by notches.

The second portion may include a circumferential base flange, a first wall extending from a first surface of the base flange, and a second wall extending from a second surface of the base flange opposite from the first wall. A central stud channel is formed through the second portion between and through the first wall, the base flange, and the second wall. The second portion may also include one or more inwardly-directed stud-engaging protuberances. For example, the stud-engaging protuberances may include inwardly-directed radial wall segments spaced apart from inwardly-directed ribs.

In at least one embodiment, the second portion may include a stud-retaining housing having upstanding beams connected to a cap defining a stud inlet, and a plurality of stud-engaging protuberances extending into an internal chamber defined by the housing. One or more of the stud-engaging protuberances may include an inwardly-directed flexible extension arm and a threaded expanded head extending from a distal end of the extension arm.

In at least one embodiment, the tether includes a main body having a first end that integrally connects to a first outer edge of the first portion, and a second end that integrally connects to a second outer edge of the second portion.

The first portion may snapably lock to the second portion in the folded state.

Certain embodiments of the present disclosure provide a fastener assembly that includes a fastener including a threaded shaft, and a stud clip that is configured to securely couple the fastener to a component, as described herein.

Figure 1:
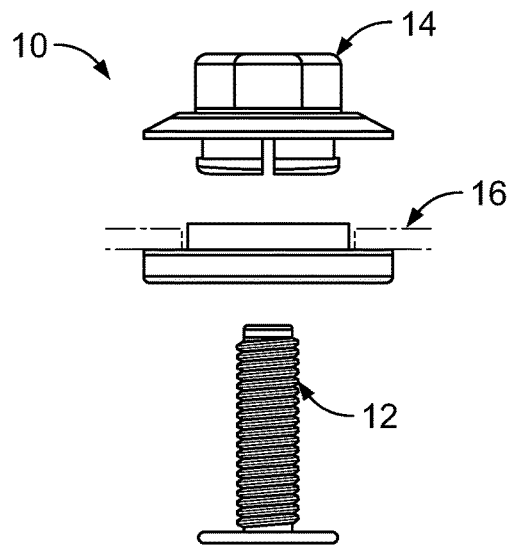
FIG. 1 illustrates a front exploded view of a known fastener assembly including a stud bolt and a nut.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide tethered stud clips that are configured to securely couple to fasteners, such as studs. The tethered stud clips are formed as a single piece. Each of the tethered stud clips is configured to securely couple to a component and a stud.

Figure 2:
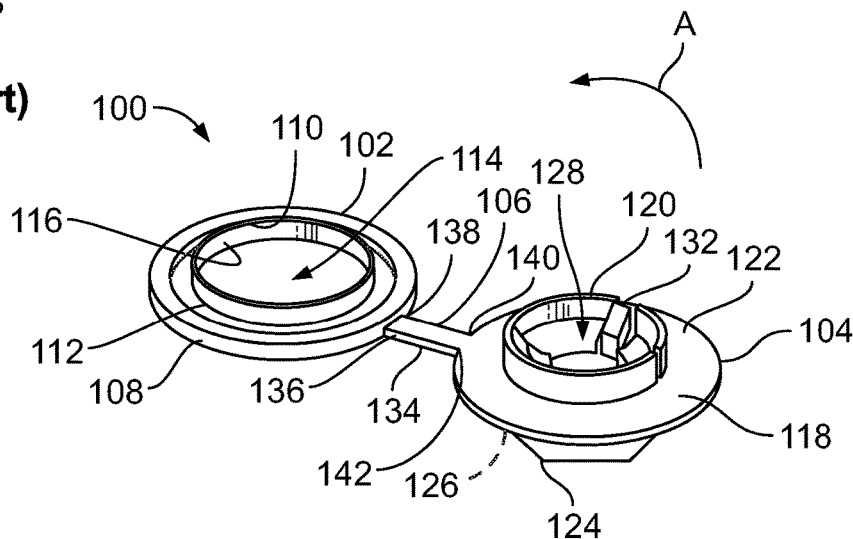
FIG. 2 illustrates a perspective top view of a stud clip, according to an embodiment of the present disclosure.

FIG. 2 illustrates a perspective top view of a stud clip 100, according to an embodiment of the present disclosure. The stud clip 100 is integrally molded and formed as a single piece. For example, the stud clip 100 may be formed through an injection molding process that forms all portions of the stud clip 100 connected together. In at least one embodiment, the stud clip 100 is formed of plastic.

The stud clip 100 includes a first portion 102 (for example, a nut retainer) integrally connected to a second portion 104 (for example, a nut that couples to a stud) through an integrally formed flexible tether 106 that connects the first portion 102 to the second portion 104. As indicated, the first portion 102 may be a nut retainer that is configured to constrain or otherwise retain the second portion 104, which may be a nut that is configured to receive and retain a portion of a stud. For example, nut retainer 102 is configured to retain the nut 104 when the nut 104 is folded onto the nut retainer 102, as described herein.

The first portion 102 may include an outer annular rim 108. A circumferential wall 110 extends upwardly (as shown in FIG. 2) from an inner diameter 112 of the rim 108. A central opening 114 is defined through the first portion 102. For example, the central opening 114 is defined by an internal surface 116 of the circumferential wall 110. As shown, the first portion 102 may have a generally circular cross-section. Optionally, an outer boundary of the first portion 102 may have a different shape, such as that of a rectangle, triangle, and/or the like.

The second portion 104 may include a circumferential base flange 118. A first wall 120 extends outwardly from a first surface 122 of the base flange 118, while a second wall 124 extends from a second surface 126 of the base flange 118 opposite from the first wall 120. A central stud channel 128 is formed through the second portion 104 between and through the first wall 120, the base flange 118, and the second wall 124. One or more inwardly-directed stud-engaging protuberances 132 (such as barbs, ribs, arms, or the like) inwardly extend from the first wall 120 into the central stud channel 128. The stud-engaging protuberances 132 are configured to securely engage portions of a stud, such as a threaded shaft of the stud. Additional stud-engaging protuberances 132 may inwardly extend from the second wall 124 into the central stud channel 128. Additionally and/or optionally, interior wall portions of the second portion 104 that define the central stud channel 128 may be threaded, and configured to threadably engage a threaded shaft of a stud.

The flexible tether 106 may be a strap, beam, and/or the like having a main body 134 having a first end 136 that integrally connects to an outer edge 138 of the first portion 102, such as an outer edge of the rim 108, and a second end 140 that integrally connects to an outer edge 142 of the second portion 104, such as an outer edge of the base flange 118. As such, the flexible tether 106 integrally connects the first portion 102 to the second portion 104, thereby preventing, minimizing, or otherwise reducing the possibility of the first portion 102 being separated from the second portion 104. The second portion 104 is configured to fold over onto the first portion 102 via the integrally connected tether 106 in the direction of arrow A.

Figure 3:
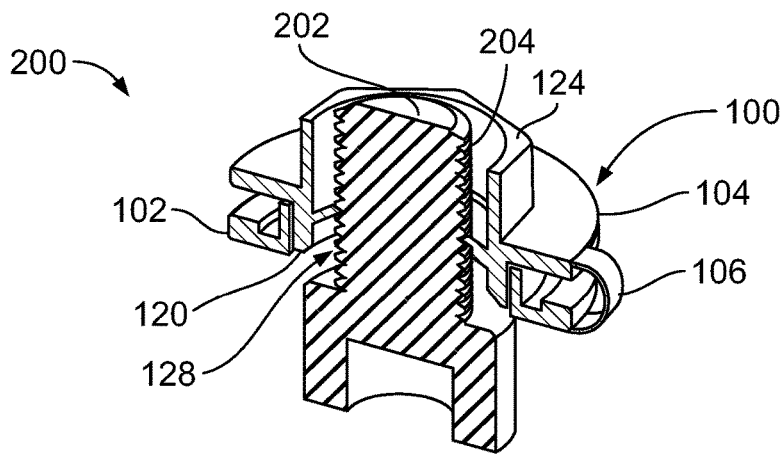
FIG. 3 illustrates a perspective cross-sectional view of a fastener assembly, according to an embodiment of the present disclosure.

FIG. 3 illustrates a perspective cross-sectional view of a fastener assembly 200, according to an embodiment of the present disclosure. The fastener assembly 200 includes the stud clip 100 coupled to a fastener, such as a stud 202. As shown, the second portion 104 is folded over onto the first portion 102 such that the first wall 120 of the second portion 102 is axially constrained by and within the circumferential wall 110 of the first portion 102. The flexible tether 106 bends and folds into an arcuate state as shown in FIG. 3 in order to accommodate the second portion 104 folding over onto the first portion 102. The stud 202 includes a threaded shaft 204 that is retained within the central stud channel 128 of the second portion 104.

Figure 4:
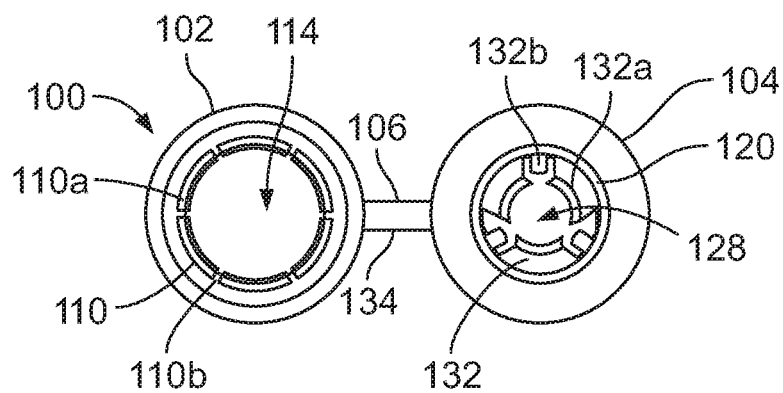
FIG. 4 illustrates a top view of a stud clip, according to an embodiment of the present disclosure.
Figure 5:
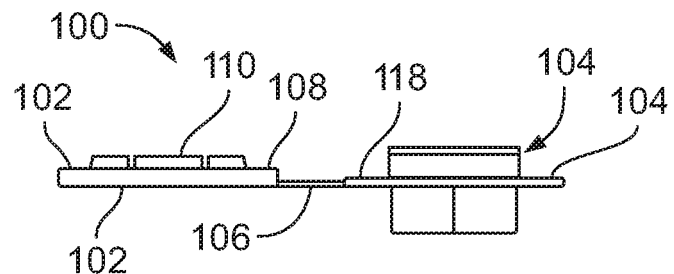
FIG. 5 illustrates a lateral view of a stud clip, according to an embodiment of the present disclosure.
Figure 6:
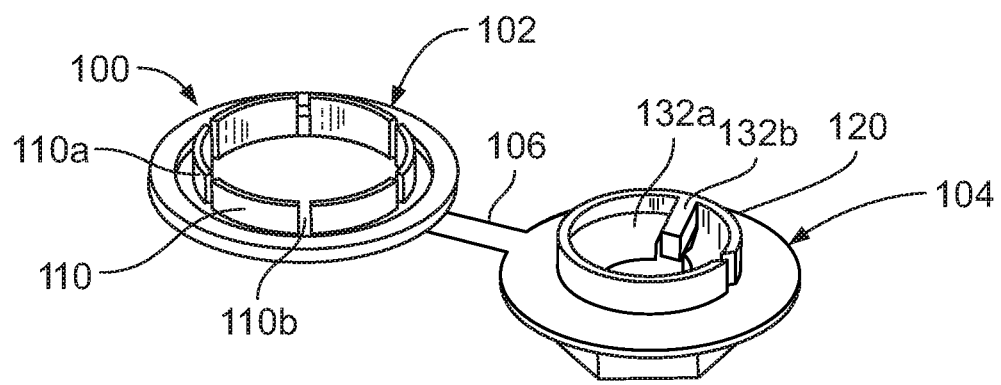
FIG. 6 illustrates a perspective top view of a stud clip, according to an embodiment of the present disclosure.

FIG. 4 illustrates a top view of the stud clip 100. FIG. 5 illustrates a lateral view of the stud clip 100. FIG. 6 illustrates a perspective top view of the stud clip 100. As shown in FIGS. 4-6, the stud clip 100 is in a non-folded, extended state in which the second portion 104 is distally located from the first portion 102.

As shown in FIG. 4, in particular, the stud-engaging protuberances 132 may include inwardly-directed radial wall segments 132a spaced apart from inwardly-directed ribs 132b. The wall segments 132a and the ribs 132b may be regularly spaced about the central stud channel 128. The wall segments 132a may be larger or smaller than shown. Similarly, the ribs 132b may be larger or smaller than shown. Optionally, the stud-engaging protuberances 132 may not include the wall segments 132a or the ribs 132b.

The first wall 120 of the second portion 104 has a smaller diameter than that of the wall 110 of the first portion 102. As such, the first wall 120 is able to fit within the central opening 114 of the first portion 102. As shown, the wall 110 may include arcuate segments 110a separated by notches 110b, in order to increase tolerance and provide flexibility (such as when the first wall 120 is moved into the central opening 114.

As shown in FIG. 5, in particular, the tether 106 may be thinner than the rim 108 of the first portion 102 and the base flange 118 of the second portion 104. The thinness of the tether 106 provides increased flexibility. For example, the base flange 118 and the rim 108 are more rigid than the tether 106. While the tether 106 is thin, flexible, and configured to fold into an arcuate state (as shown in FIG. 3), the rim 108 and the base flange 118 are configured to remain relatively rigid and stable in shape.

Figure 7:
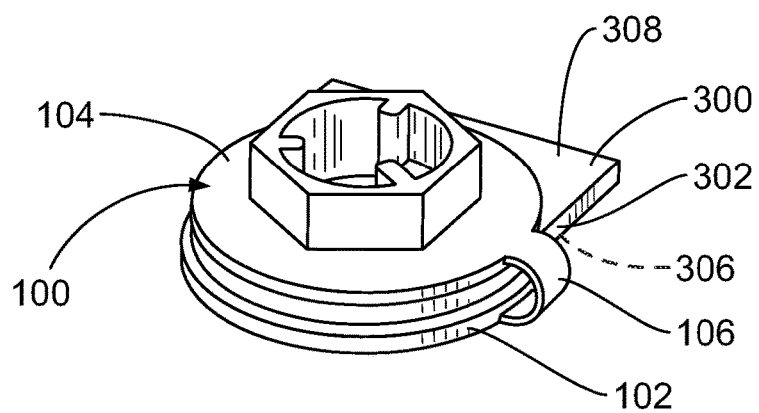
FIG. 7 illustrates a perspective top view of a stud clip secured to a component, according to an embodiment of the present disclosure.

FIG. 7 illustrates a perspective top view of the stud clip 100 secured to a component 300, such as a panel, according to an embodiment of the present disclosure. The component 300 includes an opening (hidden from view) into which the wall 110 (shown in FIGS. 4-6) of the first portion 102 and the first wall 120 of the second portion 104 are inserted. The tether 106 folds around an outer edge 302 of the component 300. The first portion 102 is folded relative to the second portion 104 via the flexible tether 106 so that the first portion is a first side 306 of the component 300, while the second portion 104 is on an opposite second side 308 of the component 300.

Figure 8:
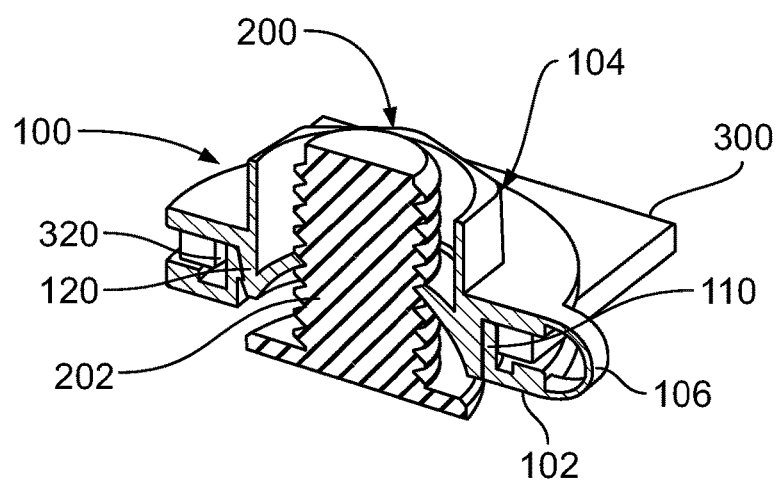
FIG. 8 illustrates a perspective cross-sectional view of a fastener assembly secured to a component, according to an embodiment of the present disclosure.

FIG. 8 illustrates a perspective cross-sectional view of the fastener assembly 200 secured to the component 300, according to an embodiment of the present disclosure. As shown in FIG. 8, as the second portion 104 folds over the component 300, the second portion 104 securely couples to the first portion 102 through an opening 320 formed through the component 300.

Figure 9:
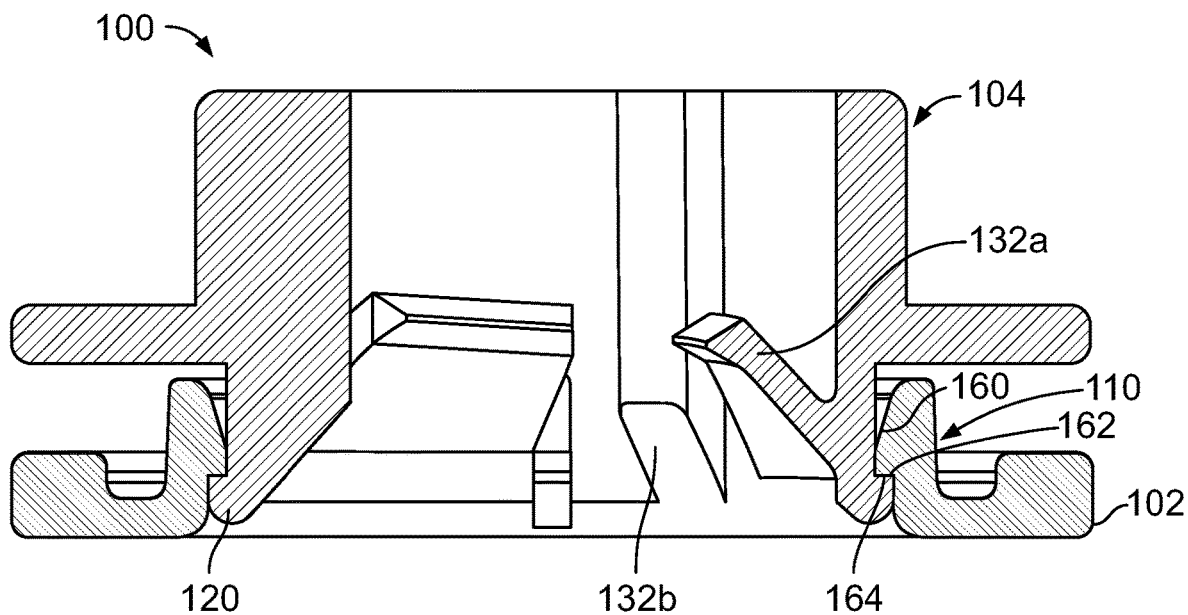
FIG. 9 illustrates an internal perspective cross-sectional view of a stud clip, according to an embodiment of the resent disclosure.
Figure 10:
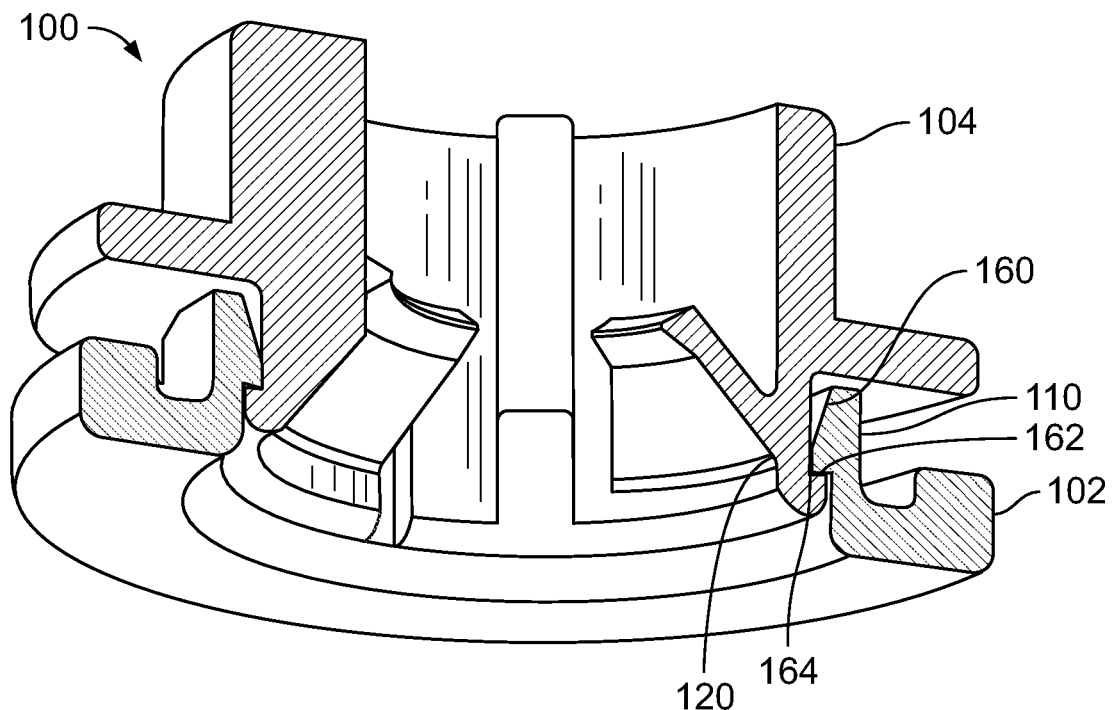
FIG. 10 illustrates an internal lower perspective cross-sectional view of a stud clip, according to an embodiment of the resent disclosure.

FIG. 9 illustrates an internal perspective cross-sectional view of the stud clip 100, according to an embodiment of the resent disclosure. FIG. 10 illustrates an internal lower perspective cross-sectional view of the stud clip 100. As shown, the second portion 104 may snapably lock to the first portion 102. For example, the circumferential wall 110 of the first portion 102 may include a ramped lead-in wall 160 connected to a blunt edge 162 that clasps onto a flat ledge 164 of the first wall 120 of the second portion 104, thereby defining a secure connection interface. Both the walls 110 and 120 may include notches that allow for deflection as the wall 120 of the second portion 104 is urged into the central opening 114 of the first portion 102.

Figure 11:
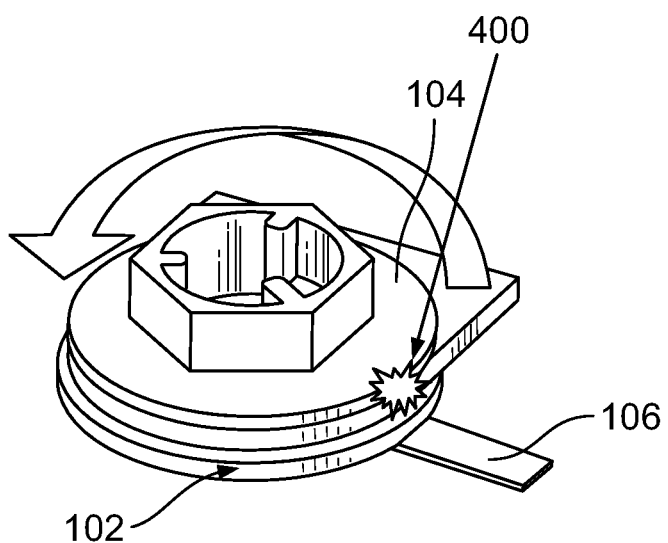
FIG. 11 illustrates a perspective view of a stud clip secured to a component in which a tether is in a disconnected state, according to an embodiment of the present disclosure.

FIG. 11 illustrates a perspective view of the stud clip 100 secured to the component 300 in which the tether 106 is in a disconnected state, according to an embodiment of the present disclosure. As shown, the tether 106 may be broken away from a tethering relationship between the first portion 102 and the second portion 104, such as at a disconnection location 400.

As described, the tether 106 attaches the first portion 102 to the second portion 104. As such, the tether 106 allows the stud clip 100 to be integrally formed and molded as a single piece via a single tool or mold. The tether 106 allows the first portion 102 and the second portion 104 to move into a folded state with respect to one another into a secure connected position. As shown in FIG. 11, the tether 106 may be broken away, such as when the stud clip is to be serviced.

Figure 12:
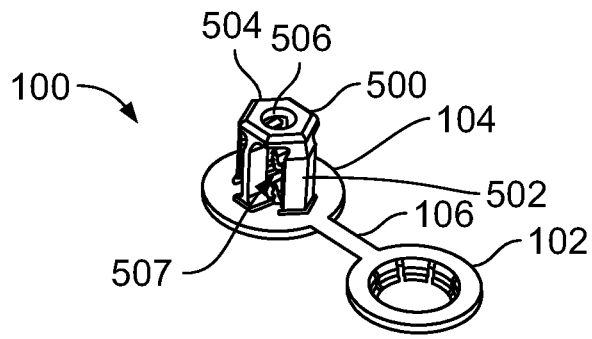
FIG. 12 illustrates a perspective top view of a stud clip, according to an embodiment of the present disclosure.
Figure 13:
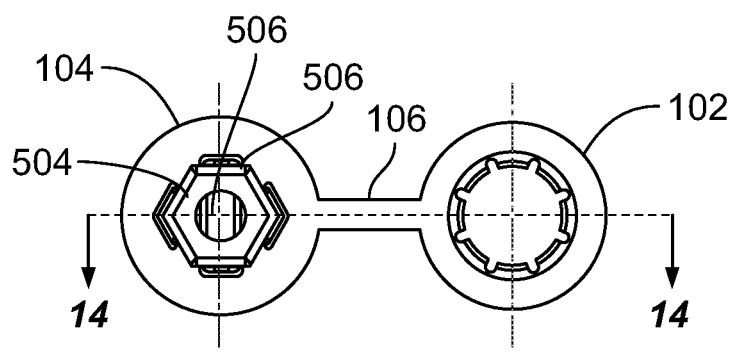
FIG. 13 illustrates a top view of a stud clip, according to an embodiment of the present disclosure.
Figure 14:
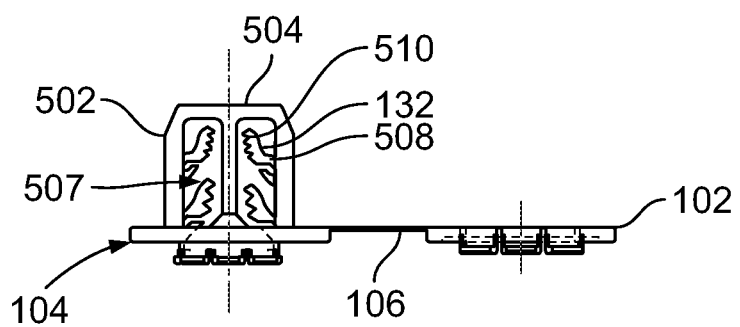
FIG. 14 illustrates a cross-sectional view of a stud clip through line 14-14 of FIG. 13, according to an embodiment of the present disclosure.

FIG. 12 illustrates a perspective top view of a stud clip 100, according to an embodiment of the present disclosure. FIG. 13 illustrates a top view of the stud clip 100. FIG. 14 illustrates a cross-sectional view of the stud clip 100 through line 14-14 of FIG. 13. The stud clip 100 shown in FIGS. 12-14 is similar to those describe with respect to FIGS. 2-11, except that the second portion 104 includes a stud-retaining housing 500 that includes upstanding beams 502 connected to a cap 504 defining a stud inlet 506. A plurality of stud-engaging protuberances 132 extend into an internal chamber 507 defined by the housing 500. One or more of the stud-engaging protuberances 132 may include an inwardly-directed flexible extension arm 508 and a threaded expanded head 510 extending from a distal end of the extension arm 508. The threaded expanded head 510 is configured to deflect and securely engage a threaded surface of a stud that passes into the internal chamber 507.

Figure 15:
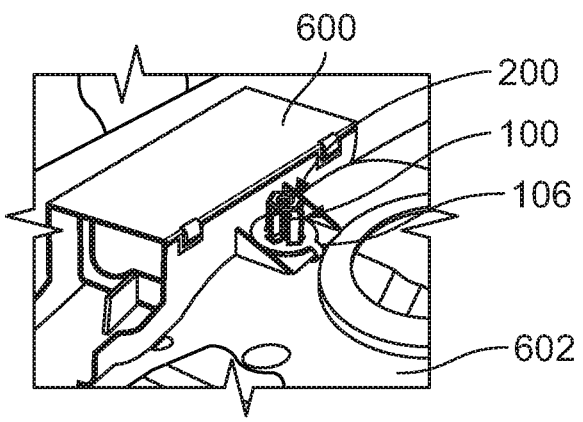
FIG. 15 illustrates a perspective top view of a first component secured to a second component through a fastener assembly, according to an embodiment of the present disclosure.
Figure 16:
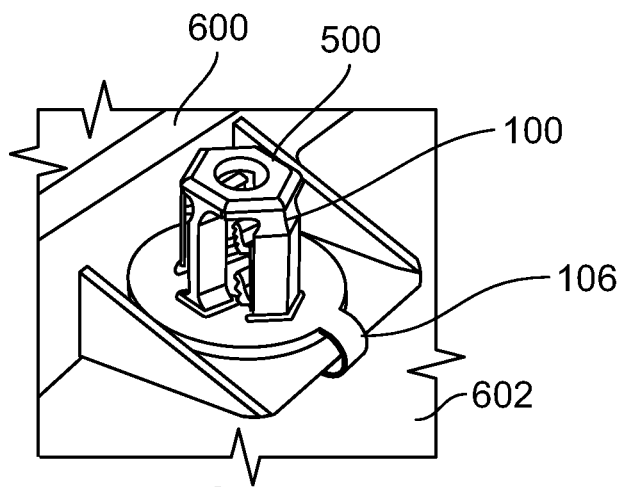
FIG. 16 illustrates a perspective top view of a stud clip secured to a first component, according to an embodiment of the present disclosure.
Figure 17:
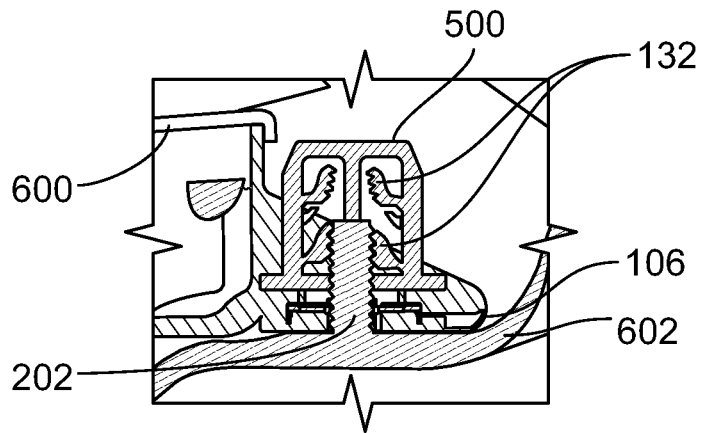
FIG. 17 illustrates a cross-sectional view of a first component secured to a second component through a fastener assembly, according to an embodiment of the present disclosure.

FIG. 15 illustrates a perspective top view of a first component 600 secured to a second component 602 through a fastener assembly 200, according to an embodiment of the present disclosure. FIG. 16 illustrates a perspective top view of the stud clip 100 secured to the first component 600. FIG. 17 illustrates a cross-sectional view of the first component 600 secured to the second component 602 through the fastener assembly 200. Referring to FIGS. 15-17, the threaded stud 202 may extend into the housing 500 from the second component 602.

Referring to FIGS. 2-15, the stud clips 100 are particularly well-suited for fastening wire cable channel structures to vehicles. Cable channels, which may typically be made of soft plastics, route and protect wiring in key areas of the vehicle, such as within an engine-bay under a hood, as well as a floor pan beneath a carpeting and interior trim. The channels provide protective guides for electrical wiring. It has been found that embodiments of the present disclosure allow wire guides to be easily, efficiently, and robustly fastened to the vehicle, while also allowing for ease of servicing.

The stud clips 100 may also be used to retain individual fasteners. For example, the stud clips 100 may be used to retain routing clips, tape-on fasteners, tie-strap fasteners, and/or the like.

As described herein, embodiments of the present disclosure provide stud clips including a first portion (such as a retainer) coupled to a second portion (such as a nut) by a flexible tether. The stud clips may be integrally molded and formed as a single piece, such as a single piece of injection-molded plastic, thereby reducing tooling costs. The tether allows the nut and retainer to be folded over and/or around a component, and securely connect to each other.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A stud clip that is configured to securely couple a fastener to a component, the stud clip comprising:
a first portion including a rim, and a circumferential wall extending from an inner diameter of the rim, wherein a central opening is formed through the first portion, wherein the circumferential wall comprises arcuate segments separated by notches;
a second portion that is configured to retain a portion of the fastener, the second portion including a circumferential base flange, a first wall extending from a first surface of the base flange, and a second wall extending from a second surface of the base flange opposite the first wall; and
a flexible tether having a main body that integrally connects a first outer edge of the first portion to the circumferential base flange of the second portion, wherein the first portion is configured to fold relative to the second portion via the flexible tether into a folded state, wherein the stud clip is moveable between the folded state and an extended state in which the second portion is distally located from the first portion, wherein the main body of the flexible tether defines a continuous thickness,
wherein a central stud channel extends through the first wall, the base flange, and the second wall.

2. The stud clip of claim 1, wherein the first portion, the second portion, and the flexible tether are integrally molded and formed together as a single piece.

3. The stud clip of claim 1, wherein the first portion is a nut retainer and the second portion is a nut that is configured to couple to the fastener, wherein the nut retainer is configured to retain the nut when the nut is folded onto the nut retainer.

4. The stud clip of claim 1, wherein the second portion further comprises one or more inwardly-directed stud-engaging protuberances.

5. The stud clip of claim 4, wherein the stud-engaging protuberances comprise inwardly-directed radial wall segments spaced apart from inwardly-directed ribs.

6. The stud clip of claim 1, wherein the second portion comprises a stud-retaining housing including:
upstanding beams connected to a cap defining a stud inlet; and
a plurality of stud-engaging protuberances extending into an internal chamber defined by the housing, wherein one or more of the stud-engaging protuberances includes an inwardly-directed flexible extension arm and a threaded expanded head extending from a distal end of the extension arm.

7. The stud clip of claim 1, wherein the tether comprises the main body having a first end that integrally connects to the first outer edge of the first portion, and a second end that integrally connects to a second outer edge of the second portion.

8. The stud clip of claim 1, wherein the first portion snapably locks to the second portion in the folded state.

9. A fastener assembly comprising:
a fastener including a threaded shaft; and
a stud clip that is configured to securely couple the fastener to a component, the stud clip comprising:
a nut retainer;
a nut that is configured to retain a portion of the fastener, the nut comprising a stud-retaining housing including:
upstanding beams connected to a cap defining a stud inlet; and
a plurality of stud-engaging protuberances extending into an internal chamber defined by the housing, wherein one or more of the stud-engaging protuberances includes an inwardly-directed flexible extension arm and a threaded expanded head extending from a distal end of the extension arm; and
a flexible tether that integrally connects the nut retainer to the nut, wherein the nut retainer is configured to fold relative to the nut via the flexible tether into a folded state, wherein the stud clip is moveable between the folded state and an extended state in which the nut is distally located from the nut retainer, wherein the nut retainer is configured to retain the nut when the nut is folded onto the nut retainer, and wherein the tether comprises a main body having a first end that integrally connects to a first outer edge of the nut retainer, and a second end that integrally connects to a second outer edge of the nut,
wherein the first outer edge defines a first thickness, the second outer edge defines a second thickness, and the main body of the tether defines a continuous third thickness and,
wherein the third thickness is less than each of the first and second thicknesses.

10. The fastener assembly of claim 9, wherein the nut retainer, the nut, and the flexible tether are integrally molded and formed together as a single piece.

11. The fastener assembly of claim 9, wherein the nut retainer comprises: a rim that includes the first outer edge; and
a circumferential wall extending from an inner diameter of the rim, wherein a central opening is formed through the nut retainer.

12. The fastener assembly of claim 11, wherein the circumferential wall comprises arcuate segments separated by notches.

13. The fastener assembly of claim 9, wherein the nut comprises:
a circumferential base flange that includes the second outer edge;
a first wall extending from a first surface of the base flange; and
a second wall extending from a second surface of the base flange opposite from the first wall, wherein a central stud channel is formed through the nut between and through the first wall, the base flange, and the second wall.

14. The fastener assembly of claim 9, wherein the nut retainer snapably locks to the nut in the folded state.

15. A stud clip that is configured to securely couple a fastener to a component, the stud clip comprising:
a first portion including a rim, and a circumferential wall extending from an inner diameter of the rim, wherein a central opening is formed through the first portion, wherein the circumferential wall comprises arcuate segments separated by notches, and wherein the circumferential wall includes a ramped lead-in wall connected to a blunt edge;
a second portion that is configured to retain a portion of a fastener, wherein the second portion comprises one or more inwardly-directed stud-engaging protuberances, and wherein the second portion includes a first wall extending outwardly from a base flange and a second wall extending outwardly from the base flange opposite the first wall, the first wall including a flat ledge configured to engage the blunt edge of the first portion to thereby define a secure connection interface; and a flexible tether having a uniform thickness that integrally connects the first portion to the second portion, wherein the first portion is configured to fold relative to the second portion via the flexible tether into a folded state, wherein the stud clip is moveable between the folded state and an extended state in which the second portion is distally located from the first portion, wherein the first portion, the second portion, and the flexible tether are integrally molded and formed together as a single piece, wherein the first portion snapably locks to the second portion in the folded state, and wherein the tether comprises a main body having a first end that integrally connects to a first outer edge of the first portion, and a second end that integrally connects to a second outer edge of the second portion.

16. The fastener assembly of claim 9, wherein the flexible tether is configured to be broken away from one of the nut retainer or the nut at a disconnection location.

* * * * *